April 12, 1949.  H. R. NORTHUP  2,466,859
OVEN LINER
Filed May 7, 1947
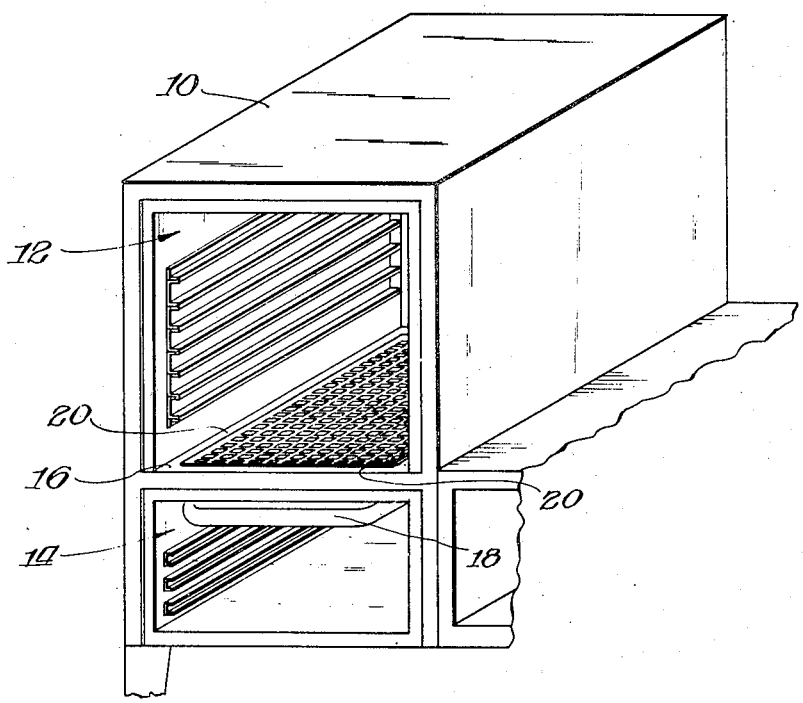
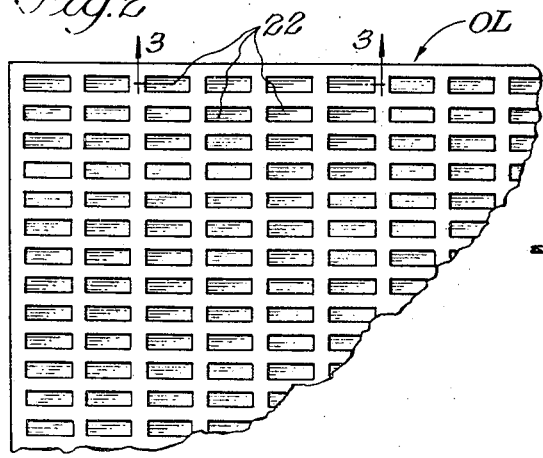
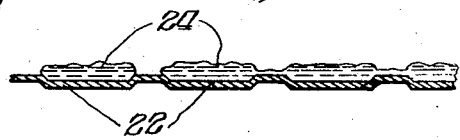
Inventor:
Harry R. Northup
By: Bair & Freeman
Attorneys Patented Apr. 12, 1949

2,466,859

UNITED STATES PATENT OFFICE 2,466,859

OVEN LINER

Harry R. Northup, South Bend, Ind.

Application May 7, 1947, Serial No. 746,428

3 Claims. (Cl. 126—19)

This invention relates to a liner particularly for the floor of an oven and adapted to receive boiled-over food whereupon the liner may be removed instead of such food being baked onto the surface of the oven floor unless the floor is cleaned up immediately.

One object of the invention is to provide a liner which does not in any way interfere with the cooking operation nor does it change the temperature characteristic of the oven.

Another object is to provide a liner which produces no odor whatever and which loses heat relatively quickly when once removed from the oven, thus preventing further burning of the boiled-over food thereon and minimizing odors of such in the kitchen.

Still another object is to provide an oven liner which is made of special metal foil whereby it is easy and inexpensive to dispose of, the liner being capable of repeated re-use until soiled by boiled-over food whereupon it can be immediately removed from the oven without having to wait for the oven to cool. Since it is of foil-like character it will quickly cool off for immediate disposal as by placing it in the garbage can.

A further object is to provide the foil so embossed that it is reinforced and stiffened as a result of such embossing, the embossing increasing its capacity for holding boiled-over food without danger of the food running off the oven liner and onto the hot floor of the oven where it soon cakes and/or glazes unless removed immediately. Immediate operation of course is usually impractical because the oven is hot and the food being baked therein is still in the process of baking.

Still a further object is to provide an oven liner which is thin enough that it does not change the heat characteristics of the oven, and small enough so that a margin is left around it for heat passage particularly where the oven floor is provided with perforations around the margin of the floor, the liner however being of sufficient extent to occupy the space under a normal size baking dish in the oven to thereby catch any boiled-over food therefrom.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a perspective view of an oven with the doors removed and showing my oven liner therein.

Figure 2 is a plan view of one corner of the oven liner, and

Figure 3 is a sectional view on the line 3—3 of Figure 2 showing a proposed shape for embossings on the oven liner sheet.

On the accompanying drawing I have used the reference numeral 10 to indicate a gas stove or the like wherein is provided an oven compartment 12 and a broiler compartment 14. The floor of the oven compartment is indicated at 16 and the oven burner is indicated at 18.

My oven liner indicated generally at A comprises a sheet of metallic foil of slightly less size than the oven floor 16 so that when inserted a space is left all around the oven liner as shown at 20 in Figure 1. If the liner sheet is too large it can be readily cut down with a pair of scissors as being made of metal foil it is thin enough not to damage the edge of the scissors.

The character of the foil is such that its melting point is well above any temperature attainable in the oven. Aluminum alloy of less than .005" thickness is suitable for this purpose. It is also desirable that the oven liner does not change the heating characteristics of the oven and being made of foil I have found that this desirable result is accomplished, whereas relatively thick metal, or that which is commonly known as "sheet metal" of over .006" thickness does change the heating characteristics of an oven considerably.

Being made of foil, it is desirable that the oven liner be given some stiffness in order to facilitate handling the sheet, that is, inserting it in and removing it from the oven. This is accomplished by embossings which are preferably in the form of shallow receptacles 22 as shown in Figures 2 and 3. These receptacles have the further desirable advantage of providing pockets to receive boiled-over food indicated at 24.

The oven liner can be used as a protection against boiled-over food and can be repeatedly used in the oven until such time as food does boil over. The receptacles 22 being many in number have considerable capacity to receive the boiled-over food without permitting it to run beyond the edges of the liner.

In case of a boil-over, the liner can be immediately removed from the oven to thus remove the boiled-over food therefrom, and being made of metal foil the liner loses its heat very quickly so that it can be immediately placed in a garbage can or otherwise disposed of. Metal foil is relatively inexpensive and therefore a clean oven can be had with the use of my oven liners without prohibitive expense being involved.

A liner can be replaced any time food boils over and the resultant convenience is obvious when compared with the necessity of having to clean out boiled-over food from the oven floor where it would fall if my oven liner were not provided. Usually such boiled-over food is left in the oven until it cools and by that time the food has been baked to such an extent that cleaning is extremely difficult. The convenience had when my oven liner is used offsets any slight expense represented by its purchase price.

The thin material of which the oven liner is made makes it practically impervious to oven heat and by leaving the space 20 I allow for free circulation of heat around the edges of the liner when it is placed in an oven. It is an excellent means to prevent smoky kitchens and unpleasant food odors throughout the house.

Some changes may be made in my oven liner without departing from the real spirit and purpose of my invention, and it is my intention to cover by my claims any modified forms of structure or use of mechanical equivalents which may be reasonably included within their scope.

I claim as my invention:

1. A disposable lower oven liner comprising a sheet of flat metal foil having a melting point higher than that attained in cooking ovens and being of less than .005" in thickness, said sheet being cut to predetermined size so as to be spaced a substantial distance from the side walls of a standard oven when placed in the bottom thereof, whereby it does not materially affect the heat characteristics of the oven, and embossings formed in said foil over substantially the entire area thereof to impart slight rigidity thereto and to catch drip.

2. A disposable lower oven liner comprising a sheet of flat metal foil having a melting point higher than that attained in cooking ovens and being of less than .005" in thickness, and embossings formed in said foil over substantially the entire area thereof to impart slight rigidity thereto and to catch drip.

3. A disposable oven liner comprising a thin flat sheet of metal foil, having a melting point higher than that attained in cooking ovens, said sheet being cut to a predetermined size and of generally rectangular form, and being adapted to be positioned in flattened form in the lower portion of a standard oven with marginal edges thereof disposed a substantial distance from the side walls of said oven, whereby not to impair the heat characteristics of the oven, said sheet of foil being formed with a multiplicity of shallow pockets or recesses over substantially the entire area thereof to impart rigidity to said sheet and serving to catch and collect drippings and overflow from foodstuffs being cooked in the oven.

HARRY R. NORTHUP.

REFERENCES CITED

The following references are of record in the file of this patent:

UNITED STATES PATENTS

| Number | Name | Date |
| --- | --- | --- |
| 1,266,412 | Crane | May 14, 1918 |
| 1,594,187 | Adami | July 27, 1926 |
| 1,830,063 | Jungers | Nov. 3, 1931 |
| 2,075,286 | Jackes | Mar. 30, 1937 |
| 2,174,425 | Schlumbohn | Sept. 26, 1939 |
| 2,226,155 | Bjornson | Dec. 24, 1940 |
| 2,236,992 | Broadley | Apr. 1, 1941 |
| 2,248,198 | Ratz | July 8, 1941 |
| 2,290,608 | Evans | July 21, 1942 |